United States Patent [19]

Beale

[11] Patent Number: 4,802,332

[45] Date of Patent: Feb. 7, 1989

[54] SLIDING SURFACE LUBRICATION PARTICULARLY ADVANTAGEOUS FOR A FREE PISTON STIRLING ENGINE

[75] Inventor: William T. Beale, Athens, Ohio

[73] Assignee: Sunpower, Inc., Athens, Ohio

[21] Appl. No.: 123,296

[22] Filed: Nov. 20, 1987

[51] Int. Cl.$^4$ .............................................. F02G 1/04
[52] U.S. Cl. ...................................... 60/520; 92/153; 92/159; 92/160
[58] Field of Search .................... 60/517, 520; 92/153, 92/154, 158, 159, 160

[56] References Cited

U.S. PATENT DOCUMENTS

| | | | |
|---|---|---|---|
| 2,907,304 | 10/1959 | Macks | 92/153 X |
| 3,124,979 | 3/1964 | Macks | 92/160 |
| 4,412,418 | 11/1983 | Beale | 60/520 |
| 4,429,530 | 2/1984 | Beale | 60/520 |

Primary Examiner—Allen M. Ostrager
Attorney, Agent, or Firm—Frank H. Foster

[57] ABSTRACT

A Stirling cycle engine is provided with gas cavities at an interface between an engine piston and a mating surface that guides the piston in its reciprocative motion to thereby achieve improved lubrication with the resulting gas film.

11 Claims, 2 Drawing Sheets

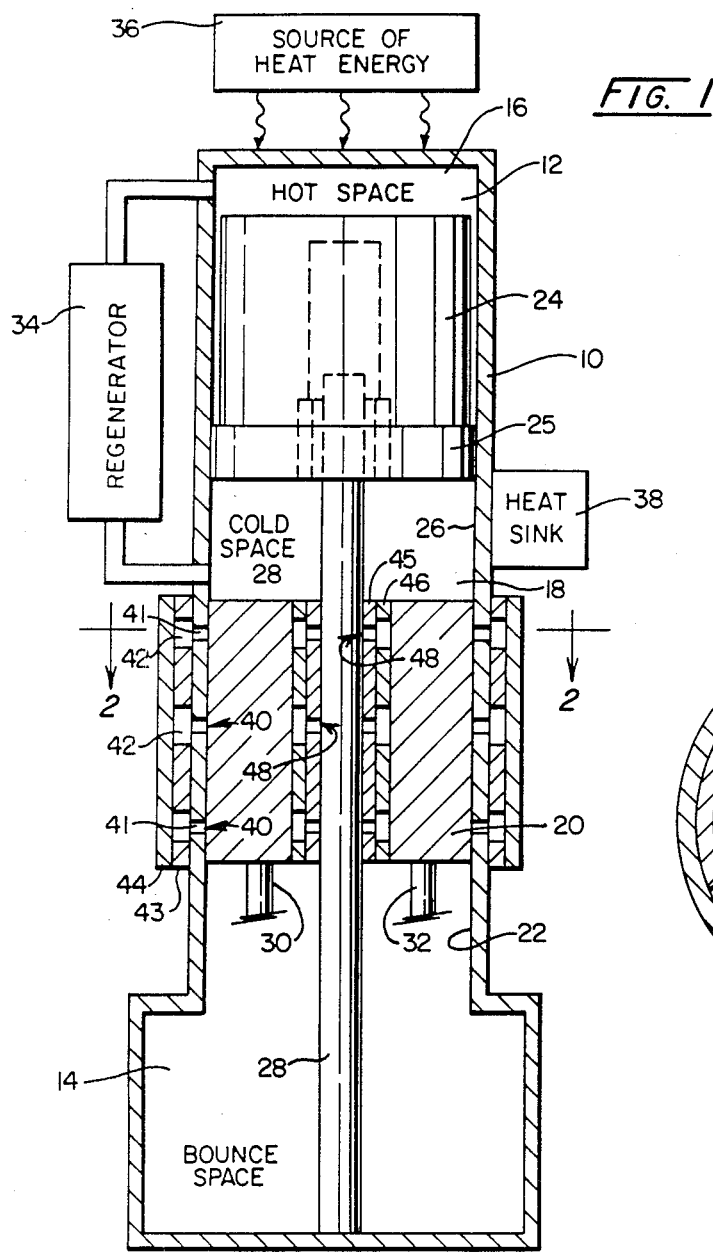

SLIDING SURFACE LUBRICATION PARTICULARLY ADVANTAGEOUS FOR A FREE PISTON STIRLING ENGINE

TECHNICAL FIELD

This invention relates generally to sliding surface lubrication, and particulary concerns providing a fluid lubricating film at one or more of the principal sliding contact surfaces of a reciprocating piston-cylinder or other device having an imposed cyclic pressure difference across the contact surfaces.

BACKGROUND ART

One major advantage of the free piston Stirling engine is that the working gas can be entirely sealed within the engine to prevent its contamination or loss by leakage. It is undesirable to lubricate the pistons of the free piston Stirling engine with traditional lubricants such as petroleum based oils and greases because such lubricants vaporize and also contaminate the heat exchangers, reducing their efficiency.

Nevertheless, it is still desirable to lubricate such engines for the purpose of extending the life of the engine components and reducing wear and maintenance.

Current methods of reducing wear and maintenance include hydrostatic gas bearings, in which a gas is pumped through holes in the bearing wall. Solid lubricant bearings are also used in which a material like teflon, for example, coats the surfaces in order to reduce wear and galling. Additionally, some bearing surfaces are formed by providing a very hard surface, typically chromium oxide, alumina, or similar materials which are used to resist wear by virtue of their extreme hardness. Finally, some Stirling engines use conventional oil lubricated bearings which are separated from the working gas by a diaphragm or wiper seal.

It is therefore, an object of the present invention to effect engine lubrication through use of a fluid which acts or is acted upon cyclically and particularly to lubricate the pistons of a Stirling engine with the working gas of the engine.

BRIEF DISCLOSURE OF INVENTION

In the present invention advantage is taken of the working gas sealed within the Stirling engine interior to permit its optimum utilization as a lubricant. Basically, the working gas passing through the clearance between mating surfaces of the engine such as the surfaces of the power piston and the engine housing cylinder wall is additionally caused to flow into and out of a plurality of dispersed gas cavities provided in at least one of such engine mating surfaces. The gas cavities, which also may be provided between the engine displacer piston and its guide rod or between the engine power piston and a guide rod for that piston component, are either of varied size (length and diameter) or of uniform size (length and diameter). In all cases the gas cavities are preferably uniformly radially situated or distributed over the extent of at least one of the component part contact surfaces.

BRIEF DESCRIPTION OF DRAWINGS

FIG. 1 is a schematic sectional view illustrating a free piston Stirling engine which incorporates different embodiments of the present invention.

FIG. 2 is a section through the Stirling engine housing taken at line 2—2 at FIG. 1.

FIG. 3 is a developed view of the interior mating contact surface of the engine housing cylinder incorporated in the Stirling engine of FIG. 1.

Figure 4:
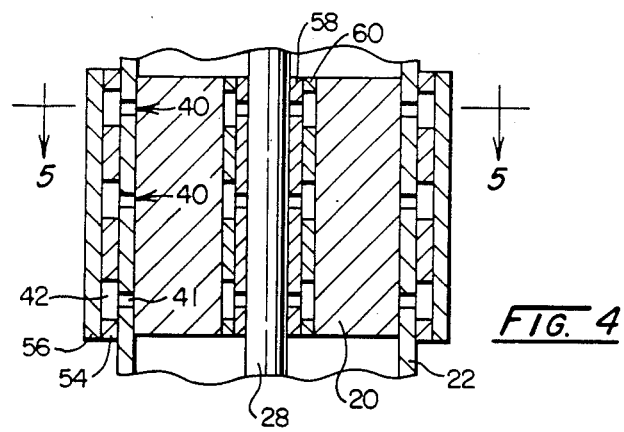
FIG. 4 is a partial sectional view of an alternate embodiment of the invention of FIG. 1.
Figure 5:
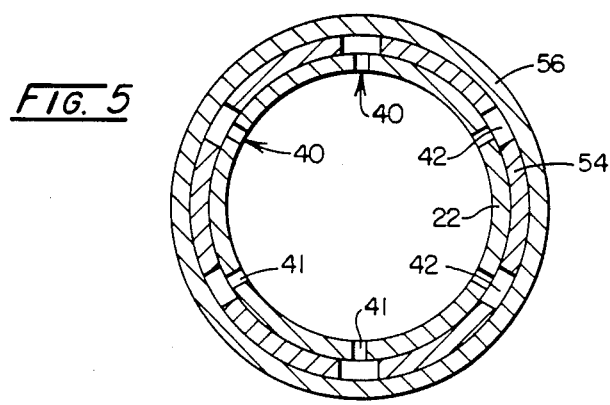
FIG. 5 is a sectional view through the housing of the Stirling engine feature of FIG. 4 taken at line 5—5.
Figure 6:
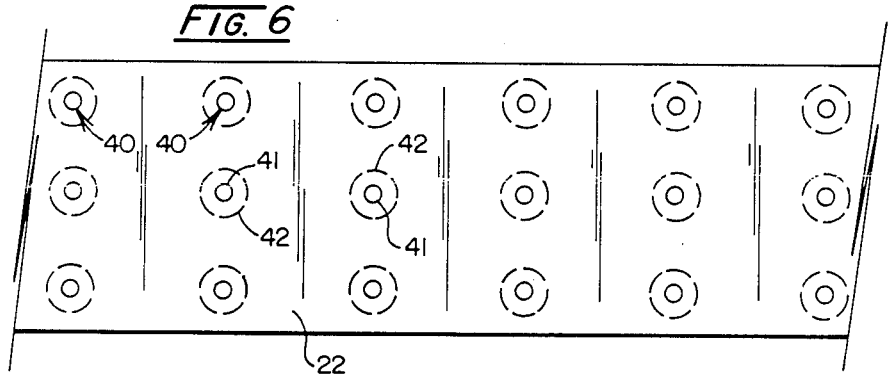
FIG. 6 is a developed view of the interior mating contact surface of the housing cylinder of FIG. 4 showing distribution of the alternate engine gas cavities of FIGS. 4 and 5.

In describing the embodiments of the invention illustrated in the drawings specific terminology will be resorted to for sake of clarity. It is intended to be understood that each specific term includes all technical equivalents which operate in a similar manner to accomplish a similar purpose.

DETAILED DESCRIPTION

FIG. 1 illustrates a free piston Stirling engine having a housing 10 enclosing a work space 12 and a buffer or bounce space 14. The work space 12 may be subdivided further into a hot space 16 and a cold space 18. These spaces are filled or charged with a gas, such as air or hydrogen, which is suitable for use in the Stirling engine.

Work space 12 is separated from bounce space 14 by a power piston 20 which is reciprocative slidable in housing cylinder section 22. A displacer piston 24, having a substantial volume and having a seal 25, is reciprocatively slidable in a housing cylinder section 26 defining in the work space 12.

A guide rod 28 is connected at one end of housing 10. Guide rod 28 functions to guide power piston 20 in its reciprocative movement and also to guide displacer piston 24 in its reciprocative movement in work space 12. Power piston rods 30 and 32 are connected to power piston 20 and provide the output mechanical energy to an electrical generator, a hydraulic pump, or other device normally located in bounce space 14 but not shown in the drawings. A regenerator 34 may be provided for enhancing the operation of the engine in a manner well known in the art.

The structure of FIG. 1 is operated as an engine or motor by the application of heat from a heat source 36 to the associated hot space 16 and the removal of heat from the cold space 18 by means of the heat exchanger or heat sink 38. As is well known in the prior art, devices of the type generally described above may also be operated as refrigeration and heating devices or for other heat pump applications by applying reciprocating mechanical energy to the power piston 20. It should therefore be understood and it is intended that the structure of the present invention may be used advantageously and all these modes of operating a cyclic engine device.

As shown in FIGS. 1-3, the interface between cylinder 22 and piston 20 is provided with a plurality of gas cavities which are each designated 40. Such cavities are preferably distributed uniformly around the periphery of the cylinder/piston and are each comprised of an entrance opening 41 and a cavity opening 42. Entrance openings 41 may be holes drilled into the wall of cylinder 22. Cavity openings 42 may be holes drilled in the sleeve member designated 43, such sleeve holes register with the entrance openings drilled in cylinder wall 22.

An outer sleeve 44 is used to close off the bottom of the cavity openings 42 incorporated into sleeve 43. Sleeves 43 and 44 may be preferably shrunk fit onto cylinder 22 in order to provide integrity against leakage for the piston cylinder and its gas cavities structure. In the FIGS. 1-3 arrangement the various gas cavities 40 are of two different sizes. It is preferred that the different sizes be uniformly distributed about the periphery of cylinder 22 as shown in the developed surface scheme of FIG. 3. Normal clearances as between mating components are recommended.

In the FIG. 1 arrangement piston 20 is also provided with gas cavities 48 that interface with guide rod 28. Such gas cavities are formed by appropriate holes incorporated in sleeves 45 and 46. As in the case of the gas cavities provided at the interface between piston 20 and cylinder 22, the gas cavities 48 provided at the interface with guide rod 28 are of two different sizes. Such gas cavities are distributed uniformly around the periphery of the hole provided in piston 20.

In some applications gas cavities of more than two different sizes may be desired.

As shown in FIG. 1, the improved lubrication arrangement of this invention may also be provided as between displacer piston 24 and the cooperating end of guide rod 28. The gas cavities provided at that interface of mated contact surfaces are incorporated into the hardware by the use of the sleeves 50 and 51 which each contain gas cavities similar to those formed in sleeves 45 and 46.

In some Stirling engine applications, it may prove advantageous to utilize gas cavities that are all of the same uniform depth and volume. Such gas cavities should be uniformly distributed over the extent of the interface between the component surfaces to be lubricated. As shown in FIG. 4, the single sized gas cavities are incorporated at the interface of cylinder 22 and piston 20 and also be at the interface between piston 20 and guide rod 28. The sleeves with the single sized gas cavities at cylinder 22 are designated 54 and 56 in FIG. 4. Also, the designated sleeves 58 and 60 at the interface of displacer piston 24 with the rod 28 have the uniform, single size gas cavities.

The essential character of the lubrication arrangement is that the gas cavities are spaced and shaped so that at any point in the cycle of pressure of the engine there is a gas flow between the cavities and each other or the cavities and the ends of the bearing (guide) surfaces so that the resulting film of gas separates the engine elements. Preferably, but not essentially, the cavities should be spaced so they are symmetrical about the engine longitudinal axis and there is no unbalanced radial force of any kind.

The needed bearing forces are caused by the tendency of the gas to flow between the cavities or the ends of the incorporating components so that any restriction of the annular flow path between the piston and the cylinder, for instance, would be resisted by the pressure difference along the clearance annulus caused by the variously different pressure phase shifts of the various sized cavities.

In comparing an electrical resistance-capacitance network with the gas cavity flow characteristic, the analog of capacitance is the cavity volume and the analog of resistance is the length/area ratio in the flow passage/ways between the cavities and each other and the ends of the reciprocating members. Such resistance varies over the cycle and with the position of the engine sliding component relative to its guiding contact surface.

The essential idea is to have a phase shift due to fluid analog of resistance-capacitance between the pressure at the ends of the piston and the cavities, and between the cavities. This phase shift is a function of the product of resistance and capacitance, and as long as this product is different between the cavities, there will be a phase shift of the pressure within them in comparison to the imposed pressure from the ends. The actual pressure is a complex function of the entire geometry of the bearing, just as is the voltage at each circuit element in an equivalent electrical network.

As for sizes, the problem is complicated by the network characteristics, which would have to be designed for each particular system and geometry, with the essential bearing forces generated by the phase shifts between the elements so that the resulting pressure differences always allowed a centering force over the cycle of operation. There is no single simple equation giving the optimum geometry.

If the fluid in incompressible, each cavity can be made as an expansible volume chamber or receptacle. For example, the chamber could be made of a resilient or elastic wall material. Alternatively, a resilient bellows arrangement, of the type used in conventional barometers, can be used to define the cavities.

While certain preferred embodiments of the present invention have been disclosed in detail, it is to be understood that various modifications may be adopted without departing from the spirit of the invention or scope of the following claims.

I claim:

1. In an engine having opposed spaces that are each filled with fluid and have an imposed cyclic pressure difference variation, the engine further having a piston member that separates said spaces, has an outer bearing surface, and moves within and relative to a female bearing member having an interior bearing surface interfacing the bearing of the piston, a lubricating means comprising a plurality of fluid cavities opening to the interfacing bearing surfaces for the cyclic intake and exhaust of said fluid out of phase with said imposed cyclic pressure variation.

2. The invention defined by claim 1 wherein the fluid cavities are of one size and are distributed uniformly over the path of said piston member.

3. The invention defined by claim 1 wherein the fluid cavities are of at least two different sizes, said different sizes being mixed and distributed over the path of said piston member.

4. The invention defined by claim 1 wherein said piston member is a free power piston of a free piston Stirling engine.

5. The invention defined by claim 1 wherein said piston member is a displacer piston of a free piston Stirling engine 6. The invention defined by claim 4 wherein said cavities are positioned in a housing guiding said power piston.

7. The invention defined by claim 5 wherein said cavities are positioned in a rod guiding said displacer piston.

8. The invention defined by claim 1 wherein the cavity is formed by a resiliently expansible receptacle.

9. In an engine having mating surfaces formed by a piston surface and by a bearing surface guiding said piston surface, the improvement comprising one of said mating surfaces having fluid cavities which open only to the mating surfaces and which provide a film of lubricating fluid between said mating surfaces when said piston surface is worked on relative to said bearing surface by a fluid pressure differential.

10. The invention defined by claim 9 wherein said fluid cavities are comprised of an entrance opening and a cavity opening connected to the entrance opening, said cavity opening being larger than said entrance opening.

11. The invention defined by claim 9 wherein said gas cavities are situated and distributed in diametrical symmetry over the extent of said mating surfaces.

* * * * *